(12) United States Patent
Fallows

(10) Patent No.: US 8,960,632 B2
(45) Date of Patent: Feb. 24, 2015

(54) DUAL BAR LINKAGE MONITOR SUPPORT WITH ADUSTMENT FEATURE

(75) Inventor: Simon Fallows, Cambridge (CA)

(73) Assignee: Mediamounts, Ltd., Cambridge, Ontario (CA)

( * ) Notice: Subject to any disclaimer, the term of this patent is extended or adjusted under 35 U.S.C. 154(b) by 605 days.

(21) Appl. No.: 13/176,069

(22) Filed: Jul. 5, 2011

(65) Prior Publication Data

US 2013/0009034 A1    Jan. 10, 2013

(51) Int. Cl.
    *F16M 13/00*    (2006.01)
    *F16M 11/20*    (2006.01)
    *F16M 11/24*    (2006.01)

(52) U.S. Cl.
CPC ........... *F16M 11/2092* (2013.01); *F16M 11/24* (2013.01); *F16M 2200/044* (2013.01); *F16M 2200/063* (2013.01); *Y10S 248/917* (2013.01)
USPC ................... 248/575; 248/278.1; 248/292.13; 248/284.1; 248/276.1; 248/917

(58) Field of Classification Search
CPC ....... F16M 11/10; F16M 11/04; F16M 11/02; F16M 2200/063
USPC ............... 248/278.1, 292.13, 292.313, 291.1, 248/292.11, 284.1, 917, 919, 920, 921, 922, 248/923, 276.1, 240, 242, 281.11, 280.11, 248/123.11, 292.12, 575
See application file for complete search history.

(56) References Cited

U.S. PATENT DOCUMENTS

| | | | |
|---|---|---|---|
| 4,826,123 A | 5/1989 | Hannah et al. | |
| 4,881,471 A | 11/1989 | Schwartz et al. | |
| D317,687 S | 6/1991 | Fabius et al. | |
| 5,738,316 A | 4/1998 | Sweere et al. | |
| 5,758,849 A | 6/1998 | Bui et al. | |
| 5,799,917 A * | 9/1998 | Li | 248/284.1 |
| 5,842,672 A | 12/1998 | Sweere et al. | |
| 5,918,841 A | 7/1999 | Sweere et al. | |
| 5,924,665 A | 7/1999 | Sweere et al. | |
| 6,021,985 A * | 2/2000 | Hahn | 248/286.1 |
| 6,076,785 A | 6/2000 | Oddsen, Jr. | |
| 6,092,474 A | 7/2000 | Chen | |
| 6,105,794 A | 8/2000 | Bauer | |
| 6,286,794 B1 | 9/2001 | Harbin | |
| 6,394,402 B2 | 5/2002 | Coonan et al. | |
| 6,409,134 B1 | 6/2002 | Oddsen, Jr. | |
| 6,431,511 B1 | 8/2002 | Pfister | |
| 6,460,816 B1 | 10/2002 | Barber | |
| 6,471,165 B2 | 10/2002 | Twisselmann | |
| 6,478,274 B1 | 11/2002 | Oddsen, Jr. | |
| 6,484,987 B2 | 11/2002 | Weaver | |

(Continued)

*Primary Examiner* — Kimberly Wood
(74) *Attorney, Agent, or Firm* — Cook Alex Ltd.

(57) ABSTRACT

An adjustable support member for mounting a device including a support arm having a base pivot block and a right link arm connected at a first end to said base pivot block and a left link arm connected at a first end to said base pivot block and spaced from said right link arm, an upper leveler block wherein the right link arm is connected at a second end to the upper leveler block and the left link arm is connected at a second end to the upper leveler block, a gas spring assembly having first and second ends with the first end of the gas spring assembly being pivotally connected to the base pivot block at a gas spring adjustment assembly and the second end of the gas spring assembly having a rod connected to the right link arm and to the left link arm at a position spaced from both the first and second ends of the right link arm and the left link arm.

13 Claims, 3 Drawing Sheets

(56) References Cited

U.S. PATENT DOCUMENTS

| | | | |
|---|---|---|---|
| 6,592,090 B1 * | 7/2003 | Li | 248/284.1 |
| 6,601,810 B2 | 8/2003 | Lee | |
| 6,609,691 B2 | 8/2003 | Oddsen, Jr. | |
| 6,695,270 B1 | 2/2004 | Smed | |
| 6,712,008 B1 | 3/2004 | Habenicht et al. | |
| 6,732,988 B2 | 5/2004 | Ihalainen et al. | |
| 6,758,454 B2 | 7/2004 | Smed | |
| D494,183 S | 8/2004 | Wills et al. | |
| 6,779,767 B2 | 8/2004 | Kuhn | |
| 6,783,105 B2 | 8/2004 | Oddsen, Jr. | |
| 6,796,540 B1 | 9/2004 | Manceor | |
| 6,837,469 B2 | 1/2005 | Wu et al. | |
| 6,854,698 B2 | 2/2005 | Oddsen, Jr. | |
| 6,857,609 B2 | 2/2005 | Stoianovici et al. | |
| D508,917 S | 8/2005 | Wills et al. | |
| 6,964,399 B1 | 11/2005 | O'Neill | |
| 6,966,532 B2 | 11/2005 | Ishizaki et al. | |
| 6,971,624 B2 | 12/2005 | Kollar et al. | |
| 7,000,873 B2 | 2/2006 | Metelski | |
| 7,014,157 B2 | 3/2006 | Oddsen | |
| 7,032,870 B2 | 4/2006 | Sweere et al. | |
| 7,055,790 B2 | 6/2006 | Schroeter | |
| 7,066,433 B2 | 6/2006 | Oddsen, Jr. | |
| 7,077,068 B1 | 7/2006 | Agee | |
| 7,090,182 B2 | 8/2006 | O'Neill | |
| 7,097,145 B2 | 8/2006 | Turner | |
| 7,100,880 B2 | 9/2006 | Oddsen, Jr. | |
| 7,118,080 B2 | 10/2006 | Chan et al. | |
| 7,168,665 B2 | 1/2007 | Hong et al. | |
| 7,175,146 B2 | 2/2007 | Kim | |
| 7,178,774 B2 | 2/2007 | Kim | |
| D539,293 S | 3/2007 | May et al. | |
| 7,198,240 B2 | 4/2007 | Chen | |
| 7,222,831 B2 | 5/2007 | Oddsen, Jr. et al. | |
| 7,243,892 B2 | 7/2007 | Pfister | |
| 7,261,266 B2 | 8/2007 | Satterfield | |
| 7,267,314 B1 | 9/2007 | Erickson | |
| D570,853 S | 6/2008 | Derry et al. | |
| 7,380,760 B2 | 6/2008 | Dittmer | |
| 7,387,286 B2 | 6/2008 | Dittmer et al. | |
| 7,389,963 B2 | 6/2008 | Cho et al. | |
| 7,395,996 B2 | 7/2008 | Dittmer | |
| 7,398,950 B2 | 7/2008 | Hung | |
| 7,404,687 B2 | 7/2008 | Neuhf | |
| 7,416,163 B2 | 8/2008 | Gaida et al. | |
| D577,729 S | 9/2008 | Derry et al. | |
| D577,731 S | 9/2008 | Altonji et al. | |
| 7,430,112 B2 | 9/2008 | Hsieh et al. | |
| 7,431,254 B2 | 10/2008 | Cheng | |
| 7,434,776 B2 | 10/2008 | Dennison et al. | |
| 7,438,269 B2 | 10/2008 | Pfister et al. | |
| 7,448,584 B2 | 11/2008 | Chen et al. | |
| 7,455,270 B2 | 11/2008 | Maloney et al. | |
| 7,478,786 B2 | 1/2009 | Copeland | |
| 7,510,155 B2 | 3/2009 | Huang et al. | |
| 7,527,233 B2 | 5/2009 | Yen | |
| 7,537,188 B2 | 5/2009 | Root et al. | |
| D594,010 S | 6/2009 | Altonji et al. | |
| 7,546,994 B2 | 6/2009 | Altonji et al. | |
| D598,917 S | 8/2009 | Luber | |
| 7,568,672 B2 | 8/2009 | Ferrer et al. | |
| 7,571,883 B2 | 8/2009 | Van Groesen et al. | |
| 7,597,299 B2 | 10/2009 | Papendieck et al. | |
| 7,600,728 B2 | 10/2009 | Petrick et al. | |
| 7,604,210 B2 | 10/2009 | Oddsen, Jr. et al. | |
| 7,618,016 B2 | 11/2009 | Brown | |
| 7,641,155 B2 | 1/2010 | Gaertner et al. | |
| 7,651,058 B2 | 1/2010 | Cho et al. | |
| 7,658,355 B2 | 2/2010 | Stoelinga | |
| 7,661,643 B2 | 2/2010 | Oh | |
| 7,665,699 B2 | 2/2010 | Oddsen, Jr. et al. | |
| 7,670,281 B2 | 3/2010 | Kronner | |
| 7,673,839 B2 | 3/2010 | Zhang et al. | |
| 7,677,515 B2 | 3/2010 | Oddsen, Jr. et al. | |
| 7,677,516 B2 | 3/2010 | Oddsen, Jr. | |
| 7,677,518 B2 | 3/2010 | Chouinard et al. | |
| 7,677,523 B2 | 3/2010 | Stokkermans | |
| 7,690,611 B2 | 4/2010 | Asamarai et al. | |
| 7,694,920 B2 | 4/2010 | Lien et al. | |
| 7,694,922 B2 | 4/2010 | Kim | |
| 7,703,733 B2 | 4/2010 | Price et al. | |
| 7,707,946 B2 | 5/2010 | Lima | |
| 7,708,243 B2 | 5/2010 | Wang et al. | |
| 7,712,710 B2 | 5/2010 | Root | |
| 7,717,383 B2 | 5/2010 | Russell | |
| 7,731,143 B2 | 6/2010 | Munday et al. | |
| 7,735,797 B2 | 6/2010 | Hu | |
| 7,748,666 B2 | 7/2010 | Oddsen, Jr. et al. | |
| 7,753,329 B2 | 7/2010 | Hanson et al. | |
| 7,766,296 B2 | 8/2010 | Choi et al. | |
| 7,770,856 B2 * | 8/2010 | Depay | 248/284.1 |
| 7,784,747 B2 | 8/2010 | Gan et al. | |
| 7,789,025 B2 | 9/2010 | Michaud, II et al. | |
| 7,789,354 B2 | 9/2010 | Gan et al. | |
| 7,789,363 B2 | 9/2010 | Duan | |
| 7,793,903 B2 | 9/2010 | Dittmer et al. | |
| 7,806,378 B2 | 10/2010 | Oddsen, Jr. | |
| 7,810,773 B2 | 10/2010 | Chi | |
| 7,828,255 B2 | 11/2010 | Yen et al. | |
| 7,832,700 B2 | 11/2010 | Ciungan | |
| 7,845,606 B2 | 12/2010 | Dennison et al. | |
| 7,854,417 B2 | 12/2010 | Gan et al. | |
| 7,861,992 B2 | 1/2011 | Huang | |
| 7,874,530 B2 | 1/2011 | Kim et al. | |
| 7,883,063 B2 | 2/2011 | Mesfin et al. | |
| 7,887,014 B2 | 2/2011 | Lindblad et al. | |
| 7,891,631 B2 | 2/2011 | Lee et al. | |
| 7,922,132 B2 | 4/2011 | Saez et al. | |
| 7,942,374 B2 | 5/2011 | Timm et al. | |
| 7,954,779 B2 | 6/2011 | Coral et al. | |
| 7,954,780 B2 | 6/2011 | Dittmer | |
| 7,965,344 B2 | 6/2011 | Wang et al. | |
| 7,967,265 B2 | 6/2011 | Oddsen, Jr. et al. | |
| 7,971,840 B2 | 7/2011 | Hirschhorn | |
| 8,199,473 B2 * | 6/2012 | Zhou | 361/679.22 |
| 2010/0079932 A1 * | 4/2010 | Zhou | 361/679.01 |

* cited by examiner

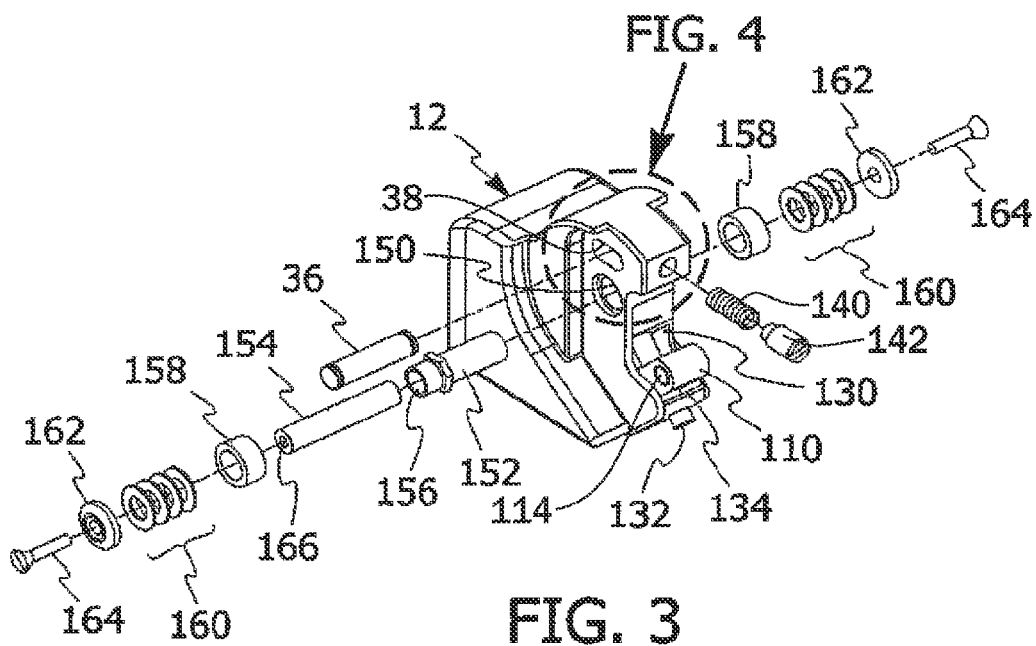
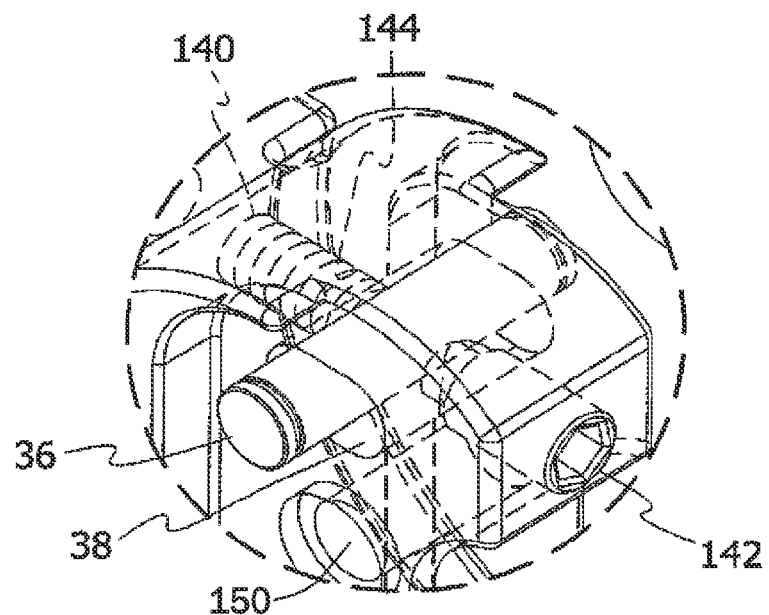

DUAL BAR LINKAGE MONITOR SUPPORT WITH ADUSTMENT FEATURE

FIELD OF THE INVENTION

The present invention relates to a support apparatus and more particularly an adjustable support arm for adjustably supporting a display device and/or input apparatus at variable heights.

BACKGROUND OF THE INVENTION

In order to maximize accurate and convenient data input and retrieval, it has become common for industries and particularly the hospital industry to have computer terminals located at various locations throughout the building instead of a dedicated office or desk. These locations include hallways and patient rooms as well as offices so that these terminals or workstations can be used by various individuals on different shifts. Few, if any of the workstations are dedicated to an individual user. Therefore, instead of having office space dedicated to a single user and workstation, the workstations are placed where they are accessible by staff as needed and are usually accessed from a standing position.

Therefore it is important to have a workstation that does not take up much space and accommodates frequent use for short periods at a time. Furthermore, since users come in a variety of heights, it is necessary that the support arm for the workstation be vertically adjustable to accommodate the height requirements of the various users and maintain the monitor and keyboard in vertical and horizontal positions, respectively relative to the floor. The invention as described herein addresses these issues and provides advantageous solutions.

OBJECTS AND SUMMARY OF THE INVENTION

One object of the invention is to provide a mounting arm for supporting a monitor and a keyboard.

Yet another object of the invention is to provide a height-adjustable support arm.

Still another object of the invention is to provide an auto-leveling support arm.

Yet another object of the invention is to provide internal link arms for providing stability and parallel movement.

Still another object of the invention is to provide a gas spring tension adjustment using a leadscrew on the base pivot block to eliminate the necessity for adjustment screws on the upper leveler block.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary the present invention is directed to an adjustable support member for mounting a device including a support arm having a base pivot block assembly, a right link arm connected at a first end to said base pivot block assembly, a left link arm connected at a first end to said base pivot block assembly and spaced from said right link arm, an upper leveler block wherein the right link arm is connected at a second end to the upper leveler block and the left link arm is connected at a second end to the upper leveler block, a gas spring assembly having first and second ends with a first end of the gas spring assembly having a piston being connected to the base pivot block assembly and the second end of the gas spring assembly having a rod connected to the right link arm and to the left link arm at a position spaced from both the first and second ends of the right link arm and the left link arm, and the base pivot block assembly having a gas spring tension adjustment assembly. The engagement of a pivot pin through the clockwise or counter clockwise adjustment of a dog screw pulls the right and left link arms forward or back along the available slot length held under tension by the gas spring. This adjustment lifts or lowers the angle of the leveler block to ensure a level perpendicular position to the floor is achieved. Through the leveling of the leveler block all other components suspended off the end of the arm (mounted to the leveler block), for example, primarily the computer monitor and keyboard, will be level or perpendicular to the floor. This prevents any further necessary adjustments to level off the keyboard or monitor when pivoting the mounting arm from left to right or positioning up or down.

BRIEF DESCRIPTION OF THE DRAWINGS

FIG. 3 is an exploded view of the base pivot block assembly; and

FIG. 4 is an enlarged view of the auto-leveling apparatus of the base pivot block assembly.

DETAILED DESCRIPTION OF THE PREFERRED EMBODIMENT

Figure 1:
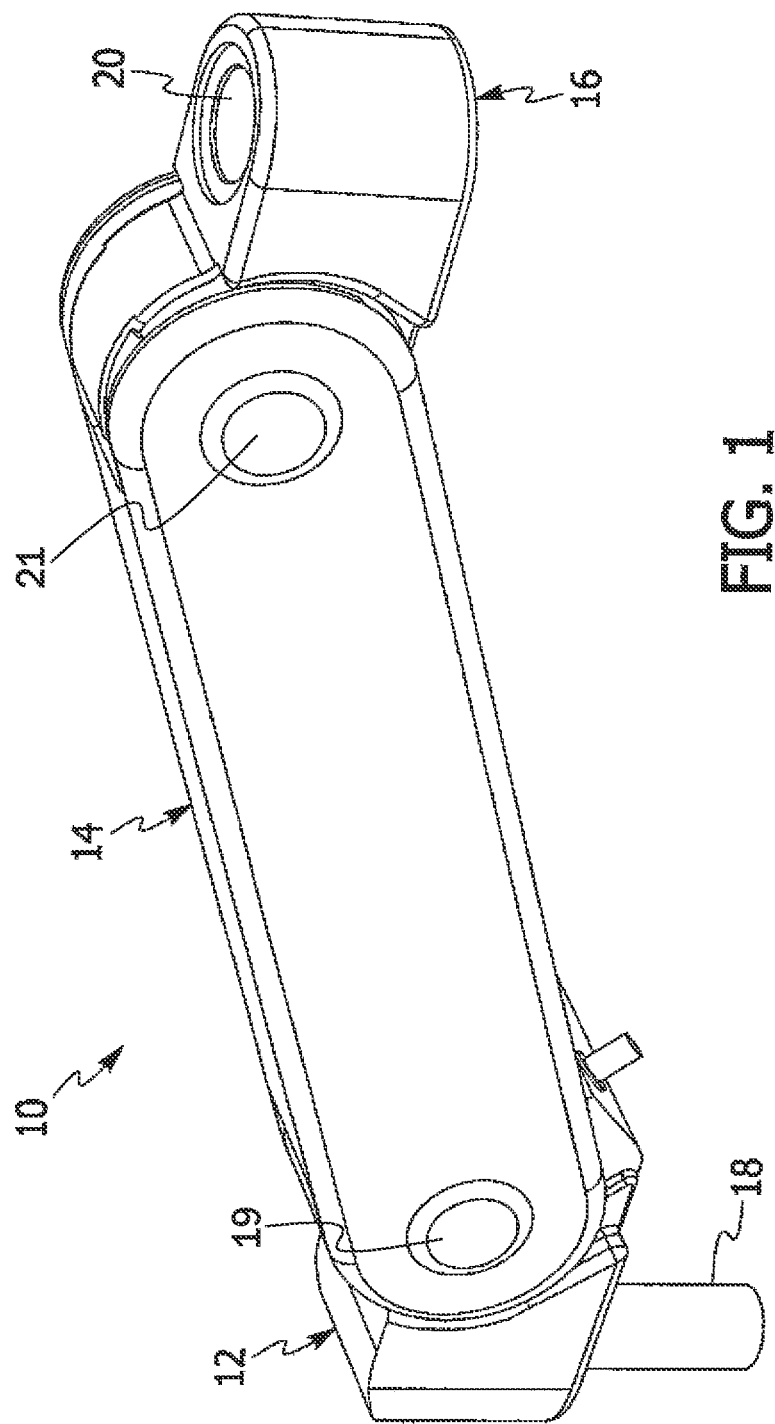
FIG. 1 is a perspective view of the adjustable support arm.

As shown in FIG. 1, the adjustable support arm 10 includes base pivot block 12, a link arm housing 14 and an upper leveler block 16. The base pivot block 12 includes an attachment post 18 for connecting the adjustable support arm 10 to a conventional support such as a wall mounted bracket or stand (not shown). The upper leveler block 16 includes a post receiving opening 20 for connecting the adjustable support arm 10 to a conventional display apparatus support (not shown). The link arm housing 14 includes lower pivot apertures 15 and upper pivot apertures 17 (seen in FIG. 2), which are covered by caps 19 and 21 when fully assembled (as seen in FIG. 1).

Figure 2:
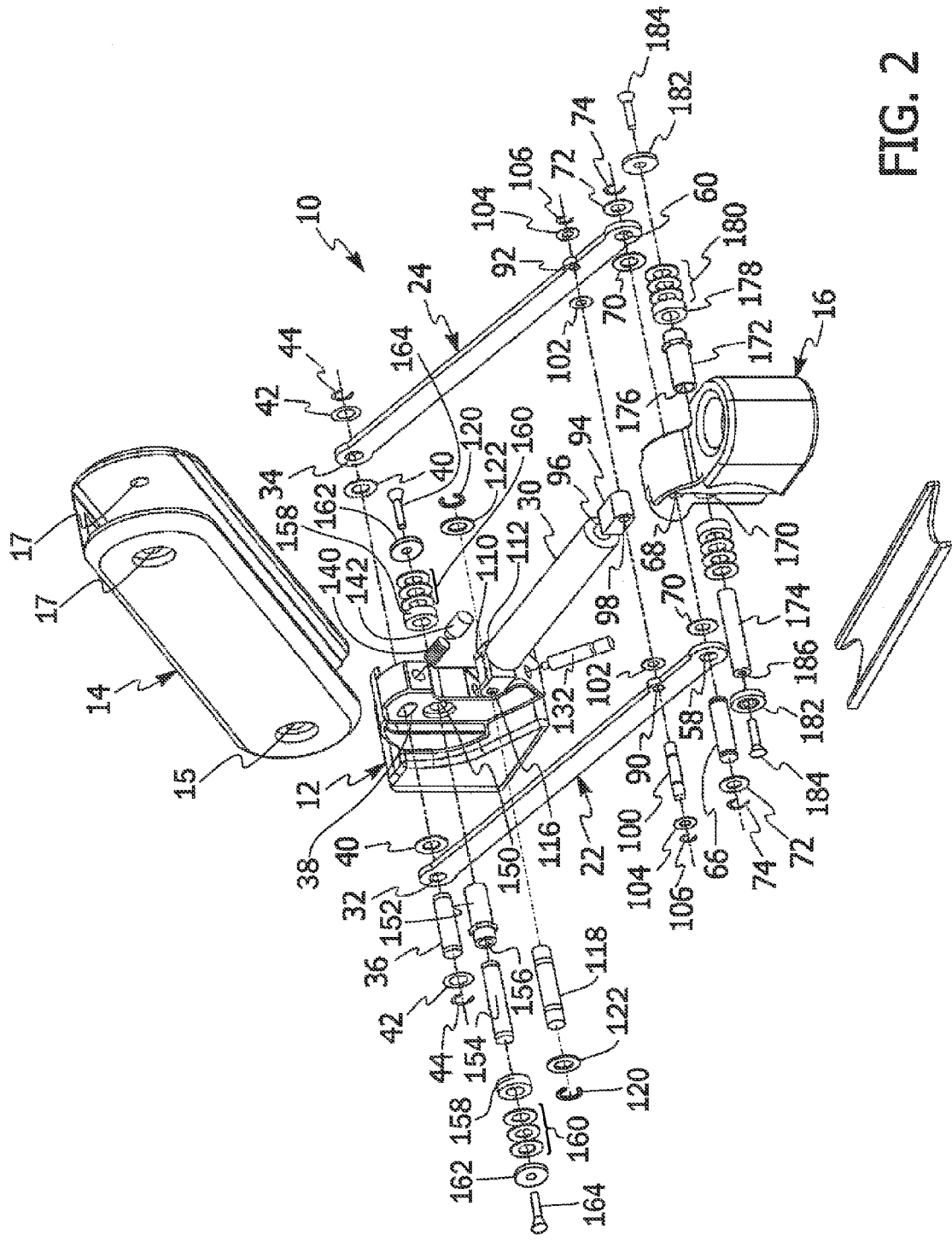
FIG. 2 is an exploded view of the adjustable support arm of FIG. 1.

Now with reference to FIG. 2, the adjustable support arm 10 is shown with the link arm housing 14 removed to reveal the link arms 22 and 24, and the gas spring 30. The link arms 22 and 24 have openings 32 and 34 and are connected to the base pivot block 12 by a pivot pin 36 which extends through openings 32 and 34 and also through opening 38 in the base pivot block 12. The opening 38 is formed as a slot which allows movement of the pivot pin 36 in a direction transverse to the longitudinal axis of the pin 36. A pair of nylon washers 40 are located on each side of the base pivot block 12 at the opening 38. After the pivot pin 36 is inserted through the opening 38, the washers 40 and openings 32 and 34 of the link arms 22 and 24, and a second pair of nylon washers 42 are placed on the pivot pin 36 and a pair of retainer clips 44 are attached to connect the link arms 22 and 24 to the base pivot block 12.

The opposite ends of link arms 22 and 24 have openings 58 and 60, respectively and the link arms 22 and 24 are retained on the upper leveler block 16. Link arms 22 and 24 are retained on the leveler block 16 by a pin 66 extending through opening 68 in the upper leveler block 16 and opening 58 and 60 respectively of the link arms 22 and 24. Nylon washers 70 are located on the pin 66 between the arms 22 and 24 and the upper leveler block 16. Another pair of nylon washers 72 are located on the pin 66 outside the arms 22 and 24, and the pin 66 is retained on the upper leveler block 16 by a pair of retainer clips 74.

The link arms 22 and 24 each include a gas spring connection point 90 and 92, respectively. The connection points 90 and 92 are preferably spaced inwardly along the length of the link arms 22, 24 from openings 58 and 60 and are offset from the longitudinal axis of the link arms 22 and 24. Gas spring 30 includes a head 94 attached to the end of a rod 96. The head 94 includes an opening 98. A pin 100 extends through the opening 98 and through connection points 90 and 92. Nylon washers 102 are preferably located on the pin 100 between the head and the connection points 90 and 92. Nylon washers 104 are preferably located on the pin 100 on the outside of the connection points 90 and 92. A pair of retainer clips 106 retain the pin 100 in place.

The gas spring 30 is connected to the base pivot block 12 at an adjustment block 110. The gas spring 30 includes a U-shaped bracket 112. The adjustment block 110 includes a first opening 114. The U-shaped bracket 112 includes openings 116 that cooperate with first opening 114 to receive a pivot pin 118 which is held in place by retainer clips 120. Nylon washers 122 placed on the pivot pin 118 reduce friction between the bracket 112 and the adjustment block 110.

Now with reference to FIG. 3, the adjustment block 110 is located in a recess 130 in the base pivot block 12. The recess 130 allows linear movement of the adjustment block 110 by turning of a tension adjustment lead screw 132 which extends through the adjustment block 110. Tension adjustment lead screw 132 is retained on the pivot block 12 by a clip 134. Tension on the gas spring 30 is adjusted by turning the lead screw 132 which causes the adjustment block 110 to move linearly in the recess 130 thereby releasing or increasing tension on the gas spring 30 depending on the direction of movement of the adjustment block 110.

As shown in FIG. 4, the autoleveling feature includes a slot 38 formed in the base pivot block 12. The pivot pin 36 is restrained from transverse movement by a compression spring 140 and a dog screw 142. The compression spring 140 is partially retained in a recess 144 formed in the pivot block 12. The spring 140 engages the pivot pin 36 while the dog screw 142 contacts the pivot pin 36 opposite the spring 140 to limit transverse movement of the pin 36. The dog screw 142 allows for adjustment of the spring pressure on the pivot pin 36. The engagement of the pivot pin 36 through the clockwise or counter clockwise adjustment of the dog screw 142 moves the right and left link arms 22 and 24 forward or back along the available slot length held under compression by the spring 140. This adjustment lifts or lowers the angle of the leveler block 16 to ensure a level perpendicular position to the floor is achieved. Through the leveling of the leveler block 16 all other components suspended off the end of the arm (mounted to the leveler block), primarily the monitor and keyboard will be level or perpendicular to the floor. This prevents any further necessary adjustments to level off the keyboard or LCD when pivoting the mounting arm from left to right or positioning up or down.

Now with reference to FIGS. 2 and 3, the base pivot block 12 also includes an opening 150 for receipt of a press fit pivot pin 152. A slide through pivot shaft 154 slides into the central opening 156 of the pivot pin 152 and pivotally connects the link arm housing 14 at its lower pivot apertures 15 to the base pivot block 12. Standoff bushings 158 are mounted on the pivot shaft 154 on both sides of the base pivot block 12 and against the sides of the link arm housing 14. Next a spring washer stack 160 formed of preferably four spring washers to create an applied friction assembly is mounted on the pivot shaft 154. Next a compression cap 162 is mounted on the pivot shaft 154 and finally a compression screw 164 engages a threaded opening 166 in each end of the pivot shaft 154 to retain the bushing 158, spring washer stack 160 and compression cap 162 on the pivot shaft 154. Tightening a compression screw 164 increases the pressure on the spring washers of the respective spring washer stack 160, thereby forcing the respective side wall of the link arm housing 14 toward the base pivot block 12 and increasing the friction between these pivotally connected components. In this manner, after adjustment to a preset level, if desired, the caps 19 may be removed to access the compression screws 164 and permit adjustment of the friction that resists upward and downward pivotal movement of the link arm housing 14 relative to the base pivot block 12. Once adjusted, the compression screws 164 and other components of the assembly may be covered by reinstalling the lower caps 19.

Similarly, the upper leveler block 16 includes an opening 170 for receiving a press fit pivot pin 172. A slide through pivot shaft 174 slides into the central opening 176 of the pivot pin 172 and pivotally connects the link arm housing 14 at its upper pivot apertures 17 to the upper leveler block 16. Standoff bushings 178 are mounted on the pivot shaft 174 on both sides of the upper leveler block 16. Next a spring washer stack 180 formed of preferably four spring washers to create an applied friction assembly is mounted on the pivot shaft 174. Next a compression cap 182 is mounted on the pivot shaft 174 and finally a compression screw 184 engages a threaded opening 186 in each end of the pivot shaft 174 to retain the compression cap 182 on the pivot shaft 174. Tightening a compression screw 184 increases the pressure on the spring washers of the respective spring washer stack 180, thereby forcing the respective side wall of the link arm housing 14 toward the upper leveler block 16 and increasing the friction between these pivotally connected components. In this manner, after adjustment to a preset level, if desired, the caps 21 may be removed to access the compression screws 184 and permit adjustment of the friction that resists upward and downward pivotal movement of the upper leveler block 16 relative to the link arm housing 14. Once adjusted, the compression screws 184 and other components of the assembly may be covered by the upper caps 21.

Thus in operation, the support arm 10 can be adjusted for balance using the gas spring adjustment block 110 along with the autoleveling feature of the compression spring 140 and dog screw 142 as well as frictional adjustment of the bushings 158, 178 and washer stacks 160 and 180 of the base pivot block 12 and of the upper leveler block 16 at their pivotal connection to the link arm housing 14, at lower pivot apertures 15 and upper pivot apertures 17, respectively, so that equipment such as a computer workstation can be supported and easily moved to different heights to account for a user's preference.

While this invention has been described as having a preferred design, it is understood that it is capable of further modifications, uses and/or adaptions of the invention following in general the principle of the invention and including such departures from the present disclosure as come within the known or customary practice in the art to which the invention pertains and as maybe applied to the central features hereinbefore set forth, and fall within the scope of the invention and the limits of the appended claims.

I claim:

1. A support arm comprising:
    a) a base pivot block;
    b) a right link arm pivotally connected at a first end to said base pivot block;

c) a left link arm pivotally connected at a first end to said base pivot block and spaced from said right link arm;
d) an upper leveler block;
e) said right link arm connected at a second end to said upper leveler block;
f) said left link arm connected at a second end to said upper leveler block;
g) a gas spring assembly having first and second ends;
h) said first end of said gas spring assembly being pivotally connected to said base pivot block at a gas spring adjustment assembly;
i) said second end of said gas spring assembly being pivotally connected to said right link arm and to said left link arm at a position spaced from both said first and second ends of said right link arm and said left link arm; and
j) said pivot connections of said first ends of said right and left link arms to said base pivot block being adjustable forward or backward relative to said base pivot block.

2. The support arm as set forth in claim 1 further comprising:
a) a screw for adjusting said pivot connections of said first ends of said right and left link arms forward or backward relative to said base pivot block.

3. The support arm as set forth in claim 2, wherein;
a) said first ends of said right and left link arms are pivotally connected to a pivot pin; and
b) said pivot pin is at a location spaced from said upper leveler block.

4. The support arm as set forth in claim 1 wherein:
a) said base pivot block includes an elongated slot extending therethrough.

5. The support arm as set forth in claim 4 further comprising:
a) a pivot pin extending through said elongated slot and to which said first ends of said right and left link arms are pivotally connected.

6. The support arm as set forth in claim 3 further comprising:
a) a compression spring positioned in said base pivot block perpendicular to a long axis of and engaging said pivot pin.

7. The support arm as set forth in claim 6 wherein:
a) said screw engages said base pivot block and said pivot pin such that said pivot pin is located between said compression spring and said screw so that when said screw is rotated, compression of said compression spring is adjusted.

8. The support arm as set forth in claim 1 wherein:
a) said connection of said right link arm and left link arm first ends to said base pivot block further comprising a pivot pin.

9. The support arm as set forth in claim 8 further comprising:
a) a link arm housing having lower pivot apertures pivotally connected to a pivot shaft that passes through said base pivot block: and
b) at least one stack of spring washers on said pivot shaft within an applied friction assembly that controls rotational friction between said link arm housing and said base pivot block.

10. The support arm as set forth in claim 9 further comprising:
a) at least one end of said pivot shaft having a threaded opening and receiving a compression screw that engages a compression cap to retain and compress said stack of spring washers toward said link arm housing.

11. The support arm as set forth in claim 1 wherein:
a) said connection of said right link arm and left link arm second ends to said upper leveler block further comprising a pin.

12. The support arm as set forth in claim 1 further comprising:
a) a link arm housing having upper pivot apertures pivotally connected to a pivot shaft that passes through said upper leveler block; and
b) at least one stack of spring washers on said pivot shaft within an applied friction assembly that controls rotational friction between said link arm housing and said upper leveler block.

13. The support arm as set forth in claim 2 further comprising:
a) at least one end of said pivot shaft having a threaded opening and receiving a compression screw that engages a compression cap to retain and compress said stack of spring washers toward said link arm housing.

\* \* \* \* \*